(No Model.)

T. MITHOFF.
HERMETICAL JOINT FOR IRON PIPES.

No. 262,086. Patented Aug. 1, 1882.

Attest
Carl Spengel

Inventor
Theodore Mithoff.
By Knight Bros.
Att'y's.

N. PETERS, Photo-Lithographer, Washington, D. C.

UNITED STATES PATENT OFFICE.

THEODORE MITHOFF, OF LANCASTER, OHIO.

HERMETICAL JOINT FOR IRON PIPES.

SPECIFICATION forming part of Letters Patent No. 262,086, dated August 1, 1882.

Application filed April 7, 1882. (No model.)

*To all whom it may concern:*

Be it known that I, THEODORE MITHOFF, of Lancaster, Fairfield county, Ohio, have invented a new and useful Joint for Iron Pipes, of which the following is a specification.

My invention relates to a device for so joining the familiar lap-welded or wrought-iron pipes to their cast-iron couplings as to render them absolutely and permanently impermeable to the ammoniacal or other confined gases.

The extensive use of ammonia and other subtle noxious and fetid fluids in refrigerating and kindred apparatus, coupled with the extreme difficulty of preventing their escape at the numerous joints of the iron piping commonly employed, has made the production of a permanently gas-tight joint for such piping a desideratum recognized by all whose avocations daily familiarize them with the nuisance. Long familiarity, both as manufacturer and user, with the nuisance and with the expedients heretofore attempted for its abatement, and the desire to discover a satisfactory solution of this industrial problem, induced me to engage in a series of costly experiments, which were persevered in through many failures and discouragements until perfect success was attained by an expedient which (as often happens in such cases) was simple, seemingly, to the verge of obviousness. This expedient, briefly expressed, consists in a ring or collet of pure iron calked into a suitable opening left in the joint for that purpose, and preferably of the form and application hereinafter specifically explained.

Figure 1:
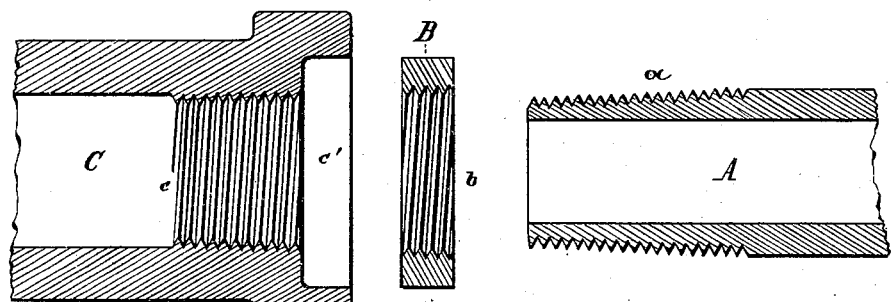
Figure 2:
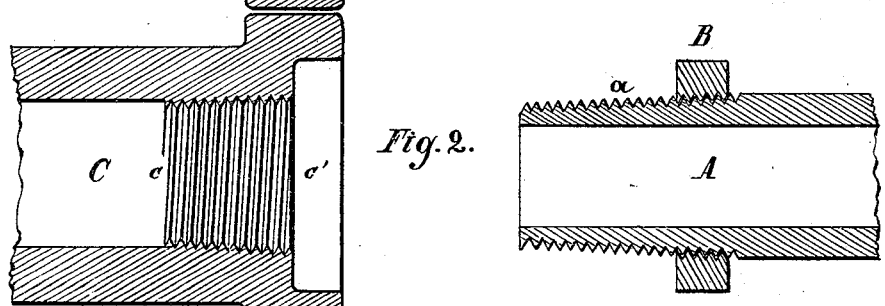
Figure 3:
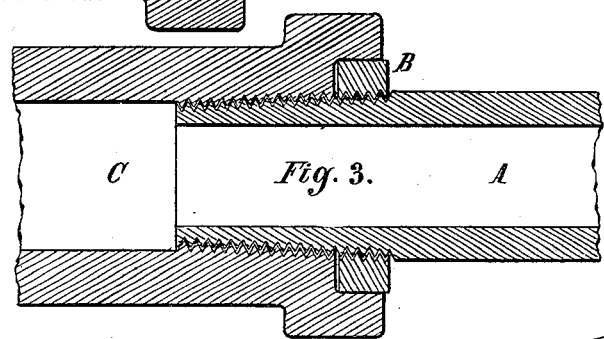
Figure 4:
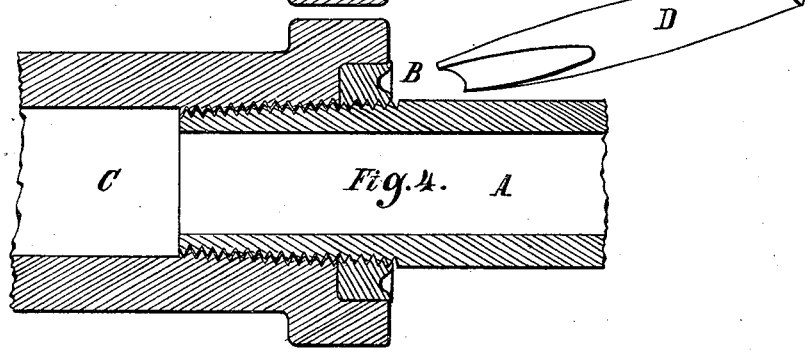

In the accompanying drawings successive stages in the production of my hermetical joint are represented by axial sections of the component parts, Figure 1 representing the parts separate; Fig. 2, the wrought-iron collet screwed to place upon the wrought-iron pipe-section; Fig. 3, the section and collet screwed into the cast-iron coupling, and Fig. 4 the completed joint.

A represents a portion of a common wrought or lap-welded iron pipe with customary tapered screw-threaded nosing, a.

B represents a ring, collet, or fillet of pure or strict ductile wrought-iron, screw-threaded, as shown at b, interiorly, so as to fit and to be screwed upon the screw-threaded nosing a of the pipe A, as seen in Fig. 2.

C represents a portion of a cast-iron coupling, screw-threaded interiorly, as at c, to receive the screw-threaded nosing a of pipe A, and having an annular recess or countersink, c', for the collet B, as seen in Fig. 3.

The parts having been screwed home, as shown in Fig. 3, the joint is rendered permanently gas-tight by repeated blows of a suitable calking-chisel, D, successively placed upon different parts of the exposed face of the collet. This is continued until the substance of the collet comes into intimate contact at every point with the opposing surfaces of the counterbore c and nosing a. (See Fig. 4.)

Practical test has demonstrated that the above-described joint, when carefully made, is absolutely and permanently gas-tight, and the device is believed to constitute the first and only instance in which such piping has been successfully sealed against the escape of subtle gases.

I am aware that it has been proposed to render the joints of the common iron piping gas-tight by the use of hard-metal nuts or glands, and also by luting with lead or other soft metal, cast into the joint; but none of these expedients, so far as known to me, have accomplished the object sought. I know of no prior use of a calked collet of wrought-iron, either generally or in the specific form herein explained.

I disclaim novelty in the use of a metal collet, broadly considered.

I claim herein as new and of my invention—

1. A gas-tight joint for iron piping, consisting of a collet of pure wrought-iron, a screw-threaded pipe end, and a countersunk coupling, the collet being inserted in the countersink and secured therein by calking, as set forth.

2. A gas-tight joint consisting of wrought-iron collet B b, wrought-iron pipe A, having tapered extremity a, and a countersunk coupling, C c c', the collet being calked within said countersink, as set forth.

In testimony of which invention I hereunto set my hand.

THEODORE MITHOFF.

Attest:
 GEO. H. KNIGHT,
 SAML. S. CARPENTER.